April 15, 1941.     A. E. SPICER     2,238,376
DRY CELL BATTERY
Filed Nov. 13, 1939
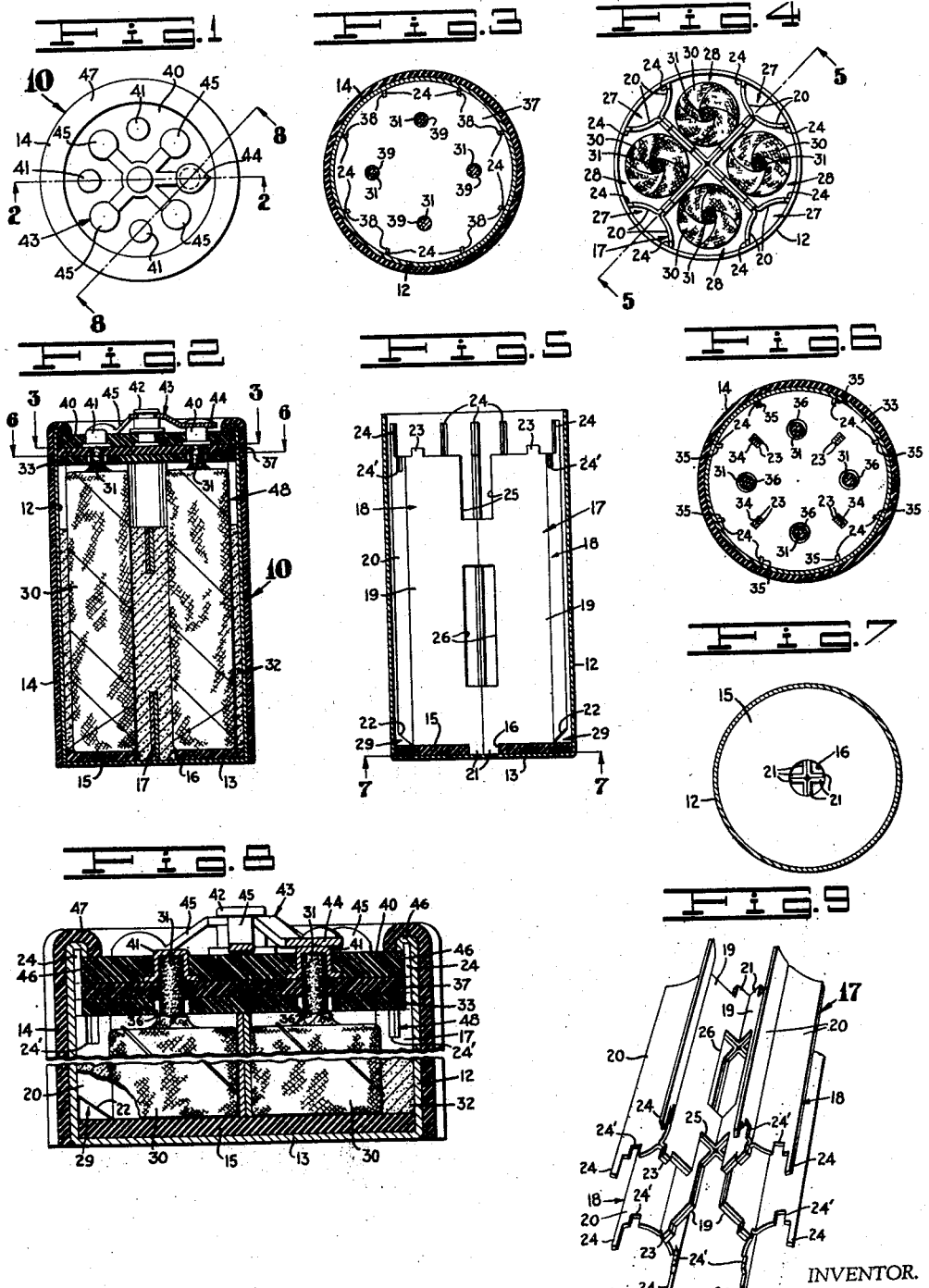
INVENTOR.
Arthur E. Spicer.
BY
ATTORNEY Patented Apr. 15, 1941

2,238,376

UNITED STATES PATENT OFFICE 2,238,376

DRY CELL BATTERY

Arthur E. Spicer, Pasadena, Calif.

Application November 13, 1939, Serial No. 304,006

4 Claims. (Cl. 136—107)

This invention relates to dry cell batteries.

The general object of the invention is to provide a dry battery with means to ventilate the bottom of the battery casing.

Another object of the invention is to provide a dry battery including a plurality of cells formed by partitioned members and wherein the partition members include means for forming gas passageways.

Another object of the invention is to provide a novel means for venting a dry cell battery.

An additional object is to provide a novel means for holding partition members in a dry cell in place.

Other objects and the advantages of this invention will be apparent from the following description taken in connection with the accompanying drawing, wherein:

Fig. 1 is a top plan view of my improved dry cell battery.

Fig. 2 is a section taken on line 2—2 of Fig. 1;

Fig. 3 is a section taken on line 3—3 of Fig. 2;

Fig. 4 is a top plan view of the battery partly assembled;

Fig. 5 is a section taken on line 5—5 of Fig. 4;

Fig. 6 is a section taken on line 6—6 of Fig. 2;

Fig. 7 is a section taken on line 7—7 of Fig. 5;

Figure 8 is an enlarged fragmentary section taken on line 8—8 of Fig. 1; and

Fig. 9 is a perspective view of the partition device.

Referring to the drawing by reference characters I have indicated my improved dry cell battery generally at 10.

As shown the battery 10 includes a cylindrical zinc casing 12 which is open at the top and closed at the lower end by an integral bottom 13. The zinc casing 12 is preferably encased in a heavy pressed paper or cardboard shell 14. Within the casing 12 and engaging the bottom 13 thereof I provide a disk 15 made of insulation material such as heavy pressed paper or cardboard which has a central aperture 16 therein.

Within the casing above the disc 15 I provide a partition device indicated at 17 which is formed of a plurality of units 18 shown as four in number. Each of the units comprises a strip of zinc bent to form vertical body portions 19 at right angles to each other. The edges of the portions 19 include inwardly curved portions 20.

At the lower end each of the body portions 19 adjacent their juncture includes a depending lug 21. At the lower end each of the curved portions 20 is beveled as at 22. At the upper end adjacent the curved portions 20 each of the body portions 10 includes an upwardly extending lug 23 and adjacent the outer edge each of the curved portions 20 includes an upwardly extending finger 24.

Opening through the upper edge thereof each of the body portions 19 adjacent their juncture has an aperture 25 therein. The apertures 25 extend downwardly a predetermined distance. Furthermore intermediate the bottom edge and the bottom of the apertures 25 each of the body portions 19 has an elongated aperture 26 therein. Each of the curved portions 20 at the upper edge thereof has a notch 24' therein.

The four units 18 are positioned in the casing 12 in a back to back relation as clearly shown in Fig. 4 with the outer edges of curved portions 20 thereof firmly engaging the inner surface of the casing to form arcuate passageways 27 while the body portions 19 together with the casing wall form chambers 28. When the partition device 17 is thus positioned in the casing the lower lugs 21 thereof are positioned in the central aperture 16 of the washer 15. Furthermore the beveled lower edges 22 of the curved portions 20 provide a communicating passageway 29 between the passageways 27 and the chambers 28 (see Figs. 5 and 8).

Positioned on the disc 15 within each of the chambers 28 I provide a depolarizing bobbin 30. Each bobbin includes a central carbon rod 31. After the bobbins 30 are positioned in chambers 28 the remaining space in the chambers is filled with a suitable electrolyte material 32 to a level with the bottom of the apertures 25 of the partition device 17. The electrolyte 32 communicates through the apertures 26 of the device 17 but is placed in the chambers 28 and is of such a character that it hardens quickly and does not block the passageways 29.

A disc 33 of insulation material such as pressed paper or cardboard is positioned in the casing 12 over the end of the partition device 17. As clearly shown in Fig. 6 the disc 33 has slots 34 therein in which the upper lugs 23 of the partition device 17 are positioned and edge slots 35 through which the fingers 24 extend. The lugs 23 are of such a length that they do not extend above the disc 33. The disc 33 further includes an aperture 36 through which the carbon rods 31 extend and which are preferably of a greater diameter than the carbon rods.

Positioned in the casing 12 on the disc 33 I provide a second disc 37 made of an insulation material such as pressed paper or cardboard. As clearly shown in Fig. 3 the disc 37 like the disc 33 has edge slots 38 therein through which the fingers 24 of the partition device 17 projects a predetermined distance and also has apertures 39 therein in which the carbon rods 31 are positioned.

Positioned within the casing 12 on the disc 37 I provide a cap disc 40 which is made of more or less rigid insulating material such as "Bakelite." The cap 40 is similar to the cap disc shown in my co-pending application Serial Number 296,435 filed September 25, 1939, and includes a plurality of open bottomed metal terminal members 41 which tightly engage the upper ends of the carbon rods 31. The cap 40 further supports a central post 42 on which a metal spider member 43 is rotatably mounted. As shown in Fig. 1 the spider member 43 includes a resilient contact finger portion 44 for individually engaging the terminals 41 and a plurality of resilient contact fingers 45 which when one engages one of the terminals 41 each engage one of the terminals 41.

The cap disc 40 like the discs 33 and 37 has edge slots 46 therein through which the fingers 24 of the partition device extend to a predetermined distance above the cap disc. (See Fig. 8.) After the cap disc 40 is placed in position in the casing 12 the upper edges of the casing 12 are turned inward over the top of the fingers 24 and then downward into tight engagement with the cap disc 40 as indicated at 46 in Fig. 8 thereby firmly holding the assembled members in the casing together.

The upper end of the outer shell 14 is turned over the top of the turned over edge 46 of the casing 12 and then turned downward into engagement with the cap disc 40 as indicated at 47 in Fig. 8.

When the battery 10 is assembled it includes a chamber 48 between the top of the electrolyte 32 and the bottom of the disc 33 and the chamber extends over the top of the bobbins. The chamber 48 is in communication with the passageways 27 through the notches 24' of the partition device 17, thus gases released in the lower portion of the battery during operation may expand into the chamber 48.

From the foregoing description it will be apparent that I have invented a novel dry cell battery which is highly efficient for the intended purpose.

Having thus described my invention I claim:

1. In a dry battery, a hollow elongated electroactive metal casing including an open top and having a plurality of longitudinal partitions therein forming compartments, a positive pole member in each compartment and an electrolyte about each pole, a disk in the open end of said casing, said partitions including portions engaging said disk, a second disk arranged above said first disk; contact means on said second disk engaging said pole members, and a shell about the casing, said shell having the upper end thereof turned inwardly and contacting said second disk.

2. In a dry cell battery, a metal casing, a plurality of metal partition members in said casing, each of said members including two portions arranged at right angles, said members abutting to form a plurality of chambers, said partition members including flanges adjacent the sides of said casing to form gas passageways, a depolarizing bobbin in each of said chambers and extending to within a predetermined level below the tops of said bobbins, said partition member adjacent the lower end thereof including means to afford communication between said passageways and said chambers and a closure member for said casing spaced above said electrolyte.

3. In a dry cell battery, a metal casing, a plurality of metal partition members in said casing, each of said members including two portions arranged at right angles, said members abutting to form a plurality of chambers, said partition members including flanges adjacent the sides of said casing to form gas passageways, a depolarizing bobbin in each of said chambers and extending to within a predetermined level below the tops of said bobbins, a closure member for said casing spaced above the electrolyte to form an upper chamber in said casing above said electrolyte, said partition member including means to affording communication between said passageways and said upper chamber.

4. In a dry cell battery, a metal casing, a plurality of metal partition members in said casing, each of said members including two portions arranged at right angles, said members abutting to form a plurality of chambers, said partition members including flanges adjacent the sides of said casing to form gas passageways, a depolarizing bobbin in each of said chambers and extending to within a predetermined level below the tops of said bobbins, said partition member adjacent the lower end thereof including means to afford communication between said passageways and said chambers, a closure member for said casing spaced a predetermined distance above said electrolyte to form an upper chamber in said casing above said electrolyte, said partition member including means to affording communication between said passageways and said upper chamber.

ARTHUR E. SPICER.